US00RE37798E

(19) United States
(12) Reissued Patent
Uchiyama et al.

(10) Patent Number: US RE37,798 E
(45) Date of Reissued Patent: Jul. 23, 2002

(54) VALVE DRIVING MEANS FOR V-TYPE ENGINE OF VEHICLE

(75) Inventors: Kazuo Uchiyama, West Bloomfield, MI (US); Takamitsu Suzuki, Shizuoka-ken (JP)

(73) Assignee: Yamaha Hatsudoki Kabushiki Kaisha, Iwata (JP)

(21) Appl. No.: 08/407,983

(22) Filed: Mar. 22, 1995

Related U.S. Patent Documents

Reissue of:
(64) Patent No.: 4,643,143
Issued: Feb. 17, 1987
Appl. No.: 06/728,843
Filed: Apr. 30, 1985

U.S. Applications:

(63) Continuation of application No. 07/406,081, filed on Sep. 12, 1989, now abandoned.

(30) Foreign Application Priority Data

May 1, 1984 (JP) ..... 59-86164

(51) Int. Cl.[7] ..... F01L 1/02; F02B 1/04
(52) U.S. Cl. ..... 123/90.31; 123/90.27
(58) Field of Search ..... 123/90.15, 90.17, 123/90.27, 90.31, 54.4, 54.5, 54.6, 54.7, 54.8

(56) References Cited

U.S. PATENT DOCUMENTS

| | | | | | |
|---|---|---|---|---|---|
| 3,888,217 | A | * | 6/1975 | Hisserich | 123/90.15 |
| 4,177,689 | A | * | 12/1979 | Zeilinger et al. | 123/90.31 |
| 4,480,603 | A | * | 11/1984 | Tsuboi | 123/90.31 |
| 4,553,473 | A | * | 11/1985 | Ichida et al. | 123/90.31 |
| 4,610,224 | A | * | 9/1986 | Fujita | 123/90.31 |
| 4,617,882 | A | * | 10/1986 | Matsumoto | 123/90.27 |
| 4,658,769 | A | * | 4/1987 | Horio et al. | 123/90.31 |
| 4,674,452 | A | * | 6/1987 | Asanomi | 123/90.31 |
| 4,716,864 | A | * | 1/1988 | Binder | 123/90.31 |

FOREIGN PATENT DOCUMENTS

| | | | | |
|---|---|---|---|---|
| DE | 550085 | | 7/1931 | |
| GB | 2128679 | * | 5/1984 | 123/90.27 |
| JP | 57210110 | | 12/1982 | |
| JP | 143107 | * | 8/1983 | 123/90.31 |
| JP | 144614 | * | 8/1983 | 123/90.31 |
| JP | 12108 | * | 1/1984 | 123/90.15 |
| JP | 15612 | * | 1/1984 | 123/90.27 |
| JP | 70820 | * | 4/1984 | 123/90.31 |

OTHER PUBLICATIONS

German publication dated Jahrgang 5 Nr.4/5 Mai 1943.

German publication dated Jahrgang 5 Nr.6/7 Juli 1943.

German Publication "Gute Fahrt", Jan., 1984 pp 40–41.

* cited by examiner

*Primary Examiner*—Weilun Lo
(74) *Attorney, Agent, or Firm*—Knobbe, Martens, Olson & Bear LLP

(57) ABSTRACT

A driving arrangement for a motor vehicle having a transversely disposed V-type four camshaft internal combustion engine. The camshafts are all driven in timed relationship with the crankshaft with a first flexible transmitter being operative to drive the intake camshafts of each cylinder bank at the same end of the engine from the crankshaft. The exhaust camshafts of each bank are driven by the intake camshafts at the opposite end of the engine.

CORRECTED PATENT

(15) Correction Information:

Corrected Version No. 1 of 5,848,578

See INID code (10), patent number and kind code

Publication Date of the Original Version: Dec. 15, 1998

47 Claims, 4 Drawing Sheets

11
15
13
58
12
26
35
59
35
25
26
16
13
15

58
11
34
12
35
45
38
38
44
23
36
24
34
35
26
14
37

VALVE DRIVING MEANS FOR V-TYPE ENGINE OF VEHICLE

Matter enclosed in heavy brackets [ ] appears in the original patent but forms no part of this reissue specification; matter printed in italics indicates the additions made by reissue.

*This application is a continuation of application Ser. No. 07/406,081, filed Sep. 12, 1989, now abandoned.*

BACKGROUND OF THE INVENTION

This invention relates to a valve driving means for V-type engines for vehicles and more particularly to an improved camshaft drive arrangement for such engines.

In high performance engines, it is well recognized that it is desirable to provide two overhead driven camshafts for operating the intake and exhaust valves of the engine. Generally, the intake valves all lie on one side of the cylinder head and are operated by an intake camshaft and the exhaust valves all lie on the other side and are driven by an exhaust camshaft. Such an arrangement is highly favored in connection with high performance engines. The use of two such positioned camshafts, however, gives rise to certain problems in connection with the driving of the camshafts. The mechanism for driving the camshafts in timed relationship with the crankshaft can add significantly to the overall length of the engine and present certain problems in connection with servicing. These problems are somewhat magnified when the camshafts are driven by rubber belts rather than chains. When belt driven, the driving belt is normally positioned externally of the engine and this can significantly add to the length of the engine. With the present emphasis toward compact engine compartments for vehicles, this can give rise to certain problems. In addition, the transverse positioning of engines in some vehicles can further complicate this problem, particularly when the engine is juxtaposed to the suspension system of the associated driven wheels.

There are a number of other accessories associated with the engine that are also driven by belts such as the alternator or generator, power steering pumps, air conditioning compressors, and other such components. The positioning of these belts in addition to the timing belts can give rise to further spacial problems and also can unduly complicate the servicing of individual belts of the engine.

The problems aforenoted are further emphasized when the engine has banks of cylinders that are not aligned with each other such as with V-type or opposed engines. This is particularly true when the cylinder banks each support pairs of overhead mounted camshafts. The additional complexities of the driving of all of these camshafts and the other accessories that are driven by belts from the engine crankshaft can be readily imagined. Also, it is desirable to minimize the overhang length of the driven sprockets of the various camshafts so as to simplify the bearing loading of them and to reduce the amount of cantilevered condition of the camshaft.

It is, therefore, a principal object of this invention to provide an improved camshaft drive arrangement for an internal combustion engine.

It is another object of this invention to provide an improved camshaft drive arrangement for internal combustion engines that simplifies the overall construction.

It is another object of this invention to provide a compact camshaft drive arrangement for an internal combustion engine so as to facilitate application in a motor vehicle.

It is a yet further object of this invention to provide an improved belt driven camshaft arrangement for V-type engines wherein servicing and interference between the various belts is substantially minimized.

SUMMARY OF THE INVENTION

A first feature of this invention is adapted to be embodied in a camshaft drive for an internal combustion engine comprising first and second camshafts supported for rotation about parallel and offset axes. The engine has an output shaft and first timing drive means drive the first camshaft directly from the output shaft. Second timing drive means are provided for driving the second camshaft from the first camshaft.

Another feature of the invention is adapted to be embodied in an internal combustion engine having a crankcase, a crankshaft journaled in the crankcase and a pair of angularly disposed cylinders extending from the crankcase and forming combustion chambers at the ends spaced from the crankcase. A first camshaft is supported for rotation about an axis parallel to the crankshaft axis and is associated with the combustion chamber of one of the cylinders for operating valves associated with that cylinder. A second camshaft is supported for rotation about an axis parallel to and offset from the crankshaft axis and the first camshaft axis and is associated with the combustion chamber of the other of the cylinders for operating valves associated with that other cylinder. First timing means drive the first camshaft in timed relationship with the crankshaft at one end of the first camshaft. Second timing means are provided for driving the second camshaft in timed relationship with the crankshaft at the opposite end of the second camshaft.

DETAILED DESCRIPTION OF THE PREFERRED EMBODIMENT

Figure 1:
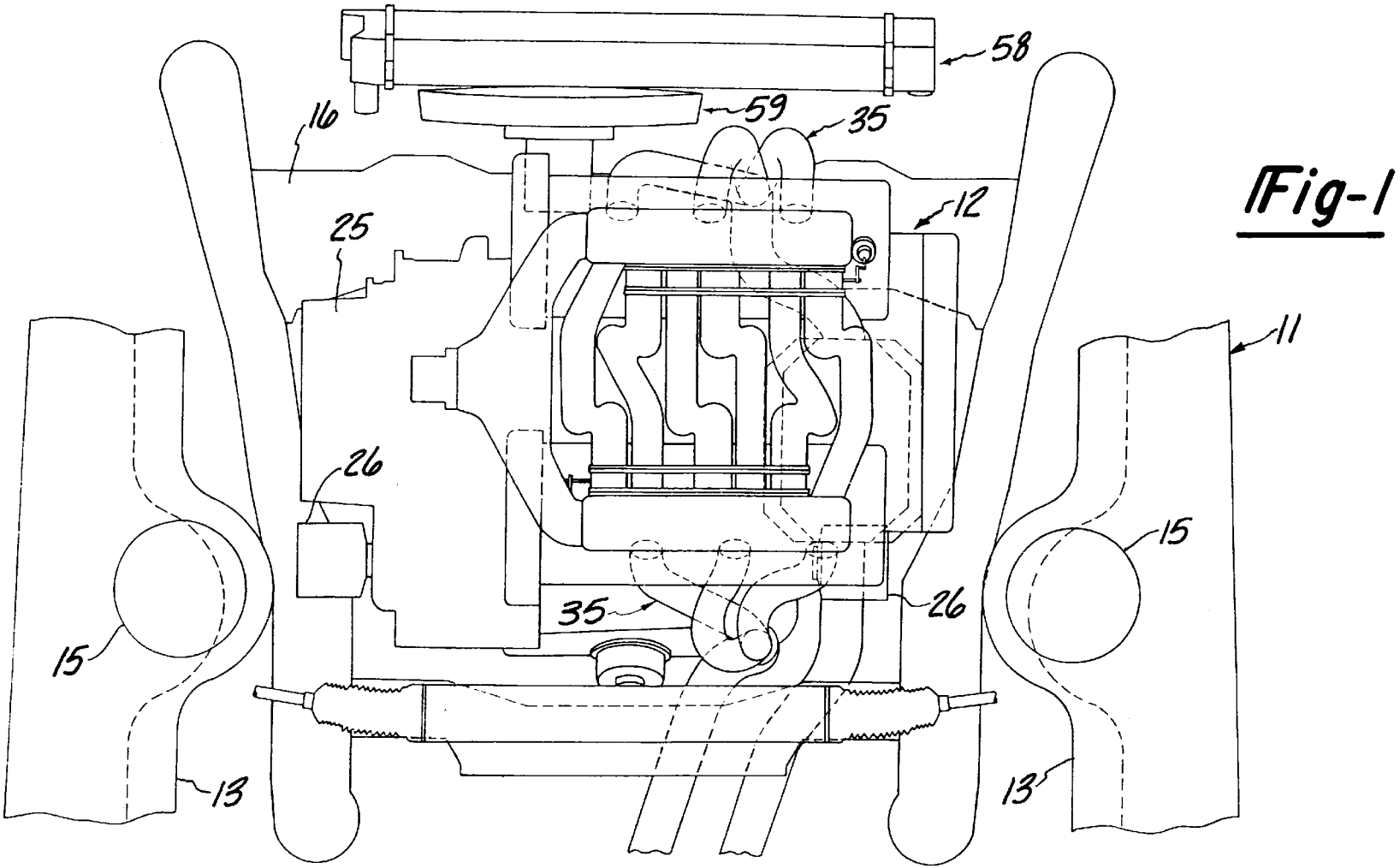
FIG. 1 is a top plan view of an internal combustion engine constructed in accordance with an embodiment of the invention and installed in a motor vehicle, portions of which have been removed so as to more clearly show the construction.
Figure 2:
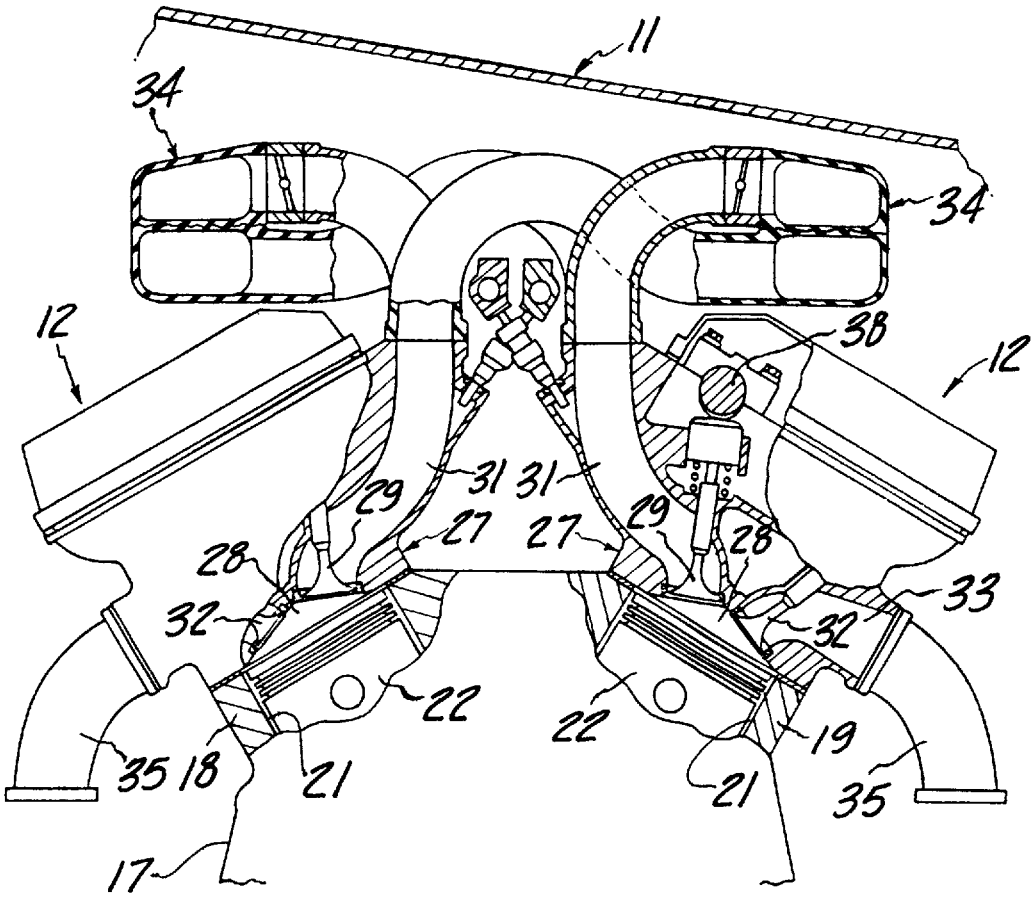
FIG. 2 is a side elevational view showing a portion of the engine as installed in the vehicle with components removed to more clearly show the construction and other portions broken away.
Figure 3:
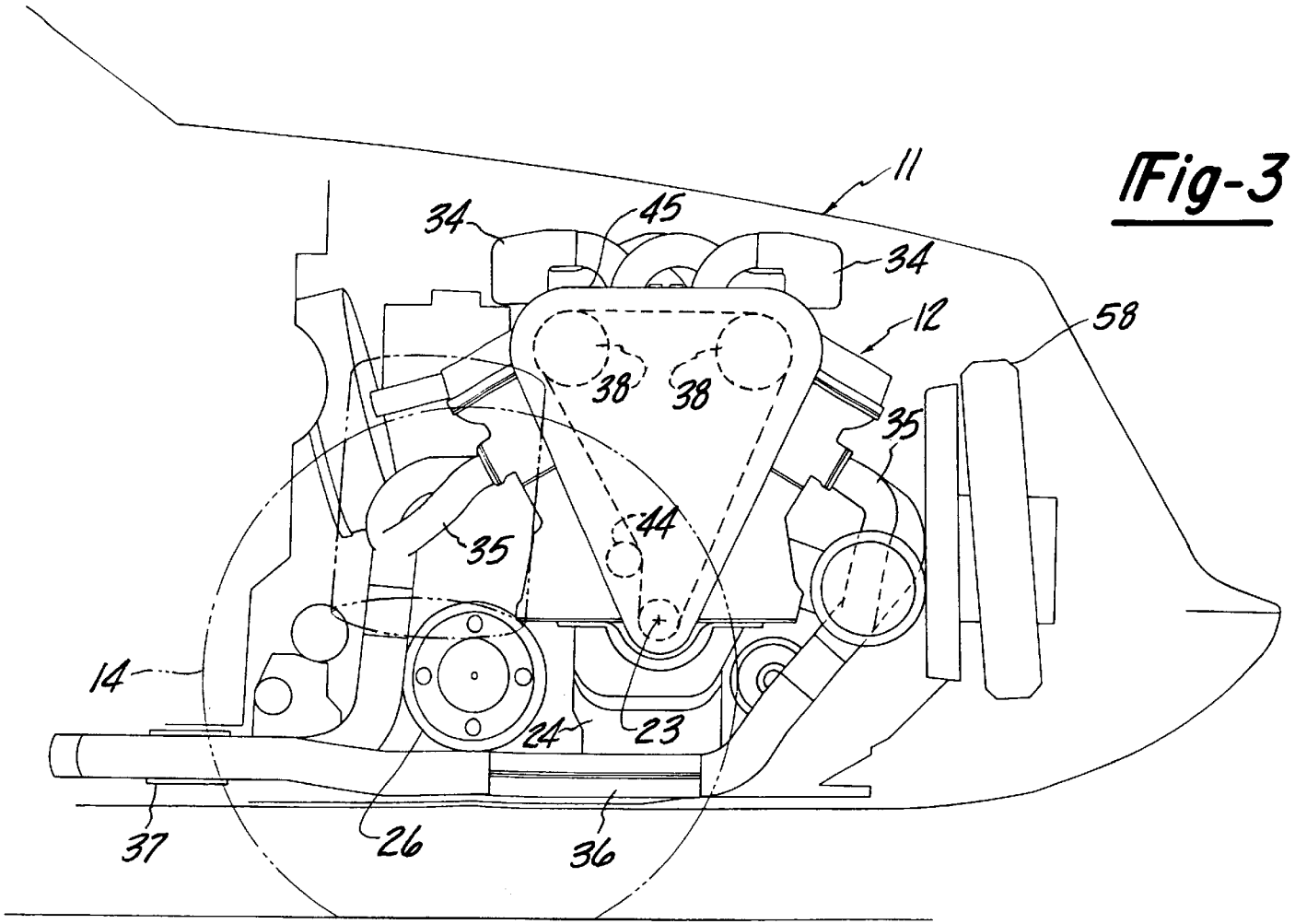
FIG. 3 is a side elevational view of the engine as installed in the vehicle.

In the drawings, a motor vehicle powered by an internal combustion engine constructed in accordance with an embodiment of the invention is shown partially and is identified generally by the reference numeral 11. The engine constructed in accordance with the invention is identified generally by the reference numeral 12 and is positioned so as to extend transversely to the longitudinal axis of the motor vehicle 11. The engine compartment of the vehicle 11 is defined in part by means of a pair of wheel wells 13 that accommodate front wheels 14 of the vehicle 11. The front wheels 14 are suspended by means of a pillar type suspension and the wheel well accommodations for this suspension are identified by the reference numeral 15. The engine 12 is mounted between the wheel wells 13 by means including a subframe assembly 16 and is disposed, as will become apparent, with the rotational axis of its output or crankshaft extending transversely of the vehicle 11.

The engine 12 is of the V-type and, to this end, its cylinder block 17 is formed with first 18 and second 19 cylinder banks that are disposed at an angle to each other. Although the engine 12 is depicted as being of the V-type, it is to be understood that the invention may be used in conjunction with engines having other cylinder formations such as opposed or, for that matter, inline type. However, the invention has certain particular advantages in conjunction with non-aligned cylinder configurations.

Each cylinder bank 18 and 19 is provided with a respective series of cylinder bores 21 in which pistons 22 are supported for reciprocation. The pistons 22 are connected by means of connecting rods (not shown) to a crankshaft having a rotational axis 23 and which is journaled for rotation within a crankcase 24 that is affixed to the underside of the cylinder block 17. As has been noted, the rotational axis 23 of the crankshaft extends transversely to the motor vehicle 11 and is disposed generally between the front wheels 14.

A combined clutch, transmission and final drive assembly 25 is positioned at one end of the engine 12 and is driven by the crankshaft in a known manner. The transmission final drive assembly 25 drives a pair of hubs 26 that are affixed to stub shafts (not shown) in a known manner so as to drive the front wheels 14.

Each of a pair of cylinder heads 27 is affixed to the respective cylinder bank 18 or 19 in a known manner. Each cylinder head 27 has a plurality of cavities 28 that cooperates with the cylinder bores 21 and pistons 22 so as to form the combustion chambers. A pair of intake valves 29 are positioned at each side of each cavity 18 and cooperate with intake ports 31 that are formed in the cylinder head. In a like manner, a pair of exhaust valves 32 are supported in each cavity 28 at the opposite side of the cylinder head 27 for controlling the flow through exhaust ports 33. An intake system including a pair of air boxes 34 is provided for the engine. Each air box 34 supplies air to one of the intake passages of the adjacent cylinder head and one of the intake passages of the cylinder head of the opposite bank in the manner as described in the copending application entitled "Intake Means Of Internal Combustion Engine", Ser. No. 634,795, filed Jul. 26, 1984, and assigned to the assignee of this invention. Since the induction system per se forms no part of the invention, it will not be described in further detail and reference may be had to the aforenoted copending application for the specific details of the induction system. It is to be understood that the invention may be practiced with other types of induction systems than that shown in the aforenoted copending application.

Exhaust manifolds 35 collect the exhaust gases from the exhaust ports 33 and discharge into appropriate exhaust systems which may include catalytic converters 36 and 37 for eventual discharge of the combustion products to the atmosphere.

The intake valves 29 of each cylinder head 27 are operated by means of a respective, overhead mounted camshaft 38. The camshafts 38 are disposed on the sides of the cylinder heads 27 adjacent to the V of the engine 12. Said another way, the intake camshafts 38 of the respective cylinder heads 27 are adjacent to each other. The intake camshafts 38 operate the intake valves 29 in a known manner, for example, through thimble tappets.

In a similar manner, exhaust camshafts 39 are supported on the respective cylinder head assemblies 27 at their remote edges above the exhaust valves 32 for operation of these exhaust valves. The axes of rotation of the intake camshafts 38, exhaust camshafts 39 and the crankshaft rotational axis 23 are all parallel to but offset from each other and all extend transversely to the motor vehicle 11.

An arrangement is provided for driving each of the two intake camshafts 38 and each of the two exhaust camshafts 39 from the crankshaft in such a manner as to permit an extremely compact assembly and while at the same time reducing the cantilevered length of the camshafts 38 and 39 and also so as to facilitate servicing of the other belt driven accessories of the engine 12.

Figure 5:
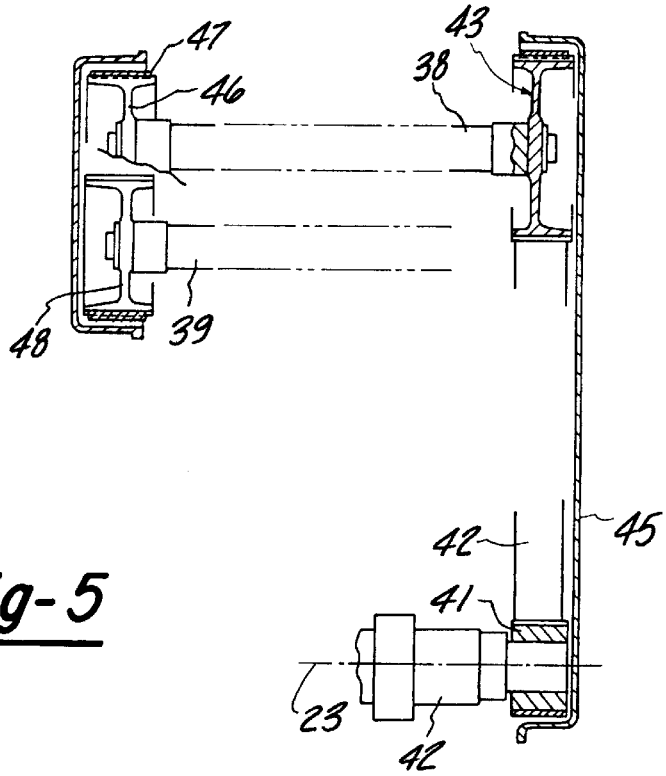
FIG. 5 is a cross-sectional view taken along the line 5—5 of FIG. 4.

For this purpose, a driving sprocket 41 is affixed to a forwardly extending portion 42 of the crankshaft, which portion extends axially beyond the crankcase 24. A toothed timing belt 42 engages the sprocket 41 and driving sprockets 43 that are fixed for rotation on the forward ends of the intake camshafts 39 at the corresponding side or end of the engine as clearly shown in FIG. 5. A belt tensioning pulley 44 is carried at the side of the cylinder block 17 and engages the timing belt 42 for maintaining the appropriate tension in it. The timing belt 42 is covered by a protective cover 45 that is fixed in an appropriate manner to the engine.

It should be noted that, unlike conventional assemblies, the timing belt 42 only drives the input camshafts 38 directly. As a result, it is possible to use a single belt for driving the camshafts of both cylinder head assemblies without having an unduly long belt and without unduly complicating the construction.

At the opposite end of each cylinder head 27, each intake camshaft 38 has a further toothed pulley or sprocket 46 affixed to it. A toothed timing belt 47 cooperates with this sprocket and a corresponding sprocket 48 affixed to the adjacent end of the exhaust camshaft 39 so as to drive each exhaust camshaft 39 from the intake camshaft 38 of the respective cylinder head. Tensioner pulleys 49 engage each of the belts 47 for maintaining their tension. The tensioner pulleys 49 are supported by the respective cylinder head assemblies 27 in an appropriate manner. Belt covers 51 cover each of the exhaust camshaft driving belts 47.

It should be noted that the pulleys 46 and 48 should be of the same diameter but their diameter need not be equal to the diameter of the camshaft driving pulleys 43 due to the unique manner in which the camshafts 38 and 39 are driven. This offers further advantages in connection with the spacial arrangement of the various components.

Figure 4:
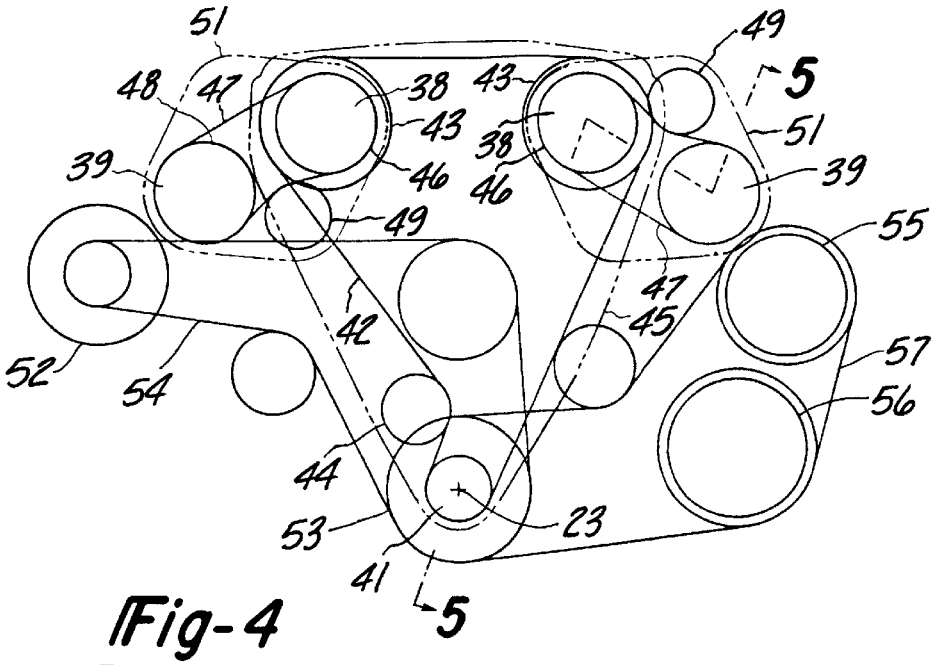
FIG. 4 is an end elevational view, partially schematic in form, showing the driving belt arrangement for the camshafts and other accessories of the engine.

Referring to FIG. 4, it is illustrated how the timing belt arrangement utilized in the engine facilitates the use of other belt driven accessories for the engine 12 without seriously or adversely affecting the serviceability of the individual belts. For example, an alternator 52 may be mounted at one side of the engine and driven from a crankshaft pulley 53 by means of a further belt 54. In a like manner, other accessories such as a power steering pump 55 and/or an air conditioning compressor 56 may be driven by a further belt 57 and positioned on the opposite side of the engine.

A cooling radiator 58 is positioned forwardly of the engine 12 in the vehicle 11 and an electrically driven fan assembly 59 may be employed for passing cooling air through the radiator 58.

It should be readily apparent from the foregoing description that the camshaft driving arrangement wherein only the intake camshafts are driven directly by the crankshaft and the exhaust camshafts are driven from the intake camshafts at the opposite end of the engine provides a very compact assembly that well lends itself to utilization in transverse engine installations. Of course, the advantages of this arrangement may be readily perceived to be applicable to other type of motor vehicle applications. In addition, the arrangement permits the use of relatively short belts while at the same time minimizing interference between belts and improving serviceability.

Although an embodiment of the invention has been illustrated and described, it is believed apparent to those skilled in the art that various changes and modifications may be made without departing from the spirit and scope of the invention, as defined by the appended claims.

What is claimed is:

1. A camshaft drive for an internal combustion engine comprising at least one cylinder, first and second camshafts supported for rotation about parallel and offset axes, an output shaft, first timing drive means for driving said first camshaft directly from said output shaft on one side of said one cylinder, and second timing drive means for driving said second camshaft from said first camshaft on the other side of said one cylinder.

2. A camshaft drive as set forth in claim 1 wherein the first timing drive means is located at one end of the engine and the second timing drive means is located at the opposite end of the engine.

3. A camshaft drive as set forth in claim 2 wherein the timing drive means comprise timing belts.

4. A camshaft drive as set forth in claim 3 wherein the camshafts each operate valves associated with the one cylinder.

5. A camshaft drive as set forth in claim 1 wherein the timing drive means comprise timing belts.

6. A camshaft drive as set forth in claim 5 wherein the camshafts each operate valves associated with the one cylinder.

7. A camshaft drive as set forth in claim 1 wherein the timing drive means comprise timing belts.

8. A camshaft drive as set forth in claim 1 wherein the engine has banks of cylinders each having at least one cylinder.

9. A camshaft drive as set forth in claim 8 wherein there are first and second camshafts associated with each cylinder bank and driven in the manner described.

10. A camshaft drive as set forth in claim 9 wherein the first timing drive means is located at one end of the engine and the second timing drive means is located at the opposite end of the engine.

11. A camshaft drive as set forth in claim 10 wherein the timing drive means comprise timing belts.

12. An internal combustion engine having a crankcase, a crankshaft journaled in said crankcase, a pair of angularly disposed cylinders extending from said crankcase and forming combustion chambers at the ends spaced from said crankcase, a first camshaft supported for rotation about an axis parallel to said crankshaft axis and associated with the combustion chamber of one of said cylinders, a second camshaft supported for rotation about an axis parallel to said crankshaft axis and said first camshaft axis and associated with the combustion chamber of the other of said cylinders, first timing means for driving said first camshaft in timed relationship with said crankshaft at one end of said first camshaft, and second timing means for driving said second camshaft in timed relationship with said crankshaft at the other end of said second camshaft.

13. An internal combustion engine as set forth in claim 12 in combination with a motor vehicle wherein the axes of rotation of the crankshaft and camshafts are disposed transversely relative to the vehicle.

14. An internal combustion engine as set forth in claim 12 further including a third camshaft supported for rotation about an axis parallel to and offset from the first camshaft axis and associated with the combustion chamber of the one cylinder, a fourth camshaft supported for rotation about an axis parallel to and offset from the axis of rotation of the second camshaft and associated with the combustion chamber of the other cylinder, the first timing means being effective to drive the first and the fourth camshafts at the one end thereof, the second timing means being effective to drive the second camshaft from the fourth camshaft at the other end thereof, and further including third timing means for driving the third camshaft from the first camshaft at the other end thereof.

15. An internal combustion engine as set forth in claim 14 wherein each of the timing means comprises a toothed belt.

16. A camshaft drive for an internal combustion engine comprising angularly related cylinder banks each of which has a respective cylinder head, first and second camshafts supported for rotation about parallel and offset axes by each of said cylinder heads, an engine driven shaft, said first camshaft of each cylinder head being located at a closer distance from said engine driven shaft that said second camshaft of each cylinder head, first timing drive means for driving both of said first camshafts directly from said driven shaft, and a pair of second timing drive means, each of said pair driving the second camshaft from the first camshaft of the respective cylinder head.

17. A camshaft drive as set forth in claim 16 wherein at least one of the timing drive means comprise a timing belt.

18. A camshaft drive as set forth in claim 17 wherein the camshafts each operate valves associated with the same cylinder.

19. A camshaft drive as set forth in claim 16 wherein the first timing drive means is located at one end of the engine and the second timing drive means is located at a point spaced from the one end of the engine toward the opposite end of the engine.

20. A camshaft drive as set forth in claim 19 wherein the timing drive means comprise timing belts.

21. A camshaft drive for an internal combustion engine comprising first and second camshafts supported for rotation about parallel and offset axes, an engine driven shaft, said first camshaft being located at a closer distance from said engine driven shaft than said second camshaft, first timing means for driving said first camshaft directly from said driven shaft, said first timing drive means being located at one end of the engine and second timing drive means for driving said second camshaft from said first camshaft, second timing drive means being located at the opposite end of the engine from said first timing drive means.

22. A camshaft drive as set forth in claim 21 wherein the timing drive means comprise timing belts.

23. A camshaft drive as set forth in claim 22 wherein the camshafts each operate valves associated with the same cylinder.

*24. An internal combustion engine having a cylinder block defining a pair of angularly related cylinder banks each driving a common crankshaft rotatably journalled within a crankcase chamber formed at the base of said cylinder block, a pair of cylinder heads each enclosing a respective one of said cylinder banks and affixed to said cylinder block, a first pair of camshafts each rotatably journalled for rotation about axes parallel to each other and said crankshaft and offset from each other and said crankshaft by a respective one of said cylinder heads at one side thereof and for operating respective valves of a first series of valves in each of said cylinder heads, a second pair of camshafts each rotatably journalled about axes parallel to*

*each other and said crankshaft and offset from each other, said crankshaft and the rotational axes of said first pair of camshafts by a respective one of said cylinder heads at another side thereof for operating a second series of valves therein, a single, first flexible transmitter directly driving each of said first pair of camshafts directly from and in timed relation to said crankshaft at one end of said engine, and a pair of second flexible transmitters at least one of which is disposed at a point spaced from said one end of said engine and separated from said first flexible transmitter by at least one cylinder of one bank of cylinders, each of said second flexible transmitters driving one of the second pair of camshafts from and in timed relation to one of the first pair of camshafts of the respective cylinder head.*

*25. An internal combustion engine as set forth in claim 24 wherein the first flexible transmitter comprises a timing belt.*

*26. An internal combustion engine as set forth in claim 24 wherein the pair of second flexible transmitters comprises a pair of timing belts.*

*27. An internal combustion engine as set forth in claim 26 wherein the first flexible transmitter also comprises a timing belt.*

*28. An internal combustion engine as set forth in claim 24 wherein each cylinder bank has a plurality of cylinders formed therein.*

*29. An internal combustion engine as set forth in claim 28 wherein the at least one of the second flexible transmitters is disposed at the other end of the engine.*

*30. An internal combustion engine as set forth in claim 29 wherein the first flexible transmitter comprises a timing belt.*

*31. An internal combustion engine as set forth in claim 29 wherein the pair of second flexible transmitters comprises a pair of timing belts.*

*32. An internal combustion engine as set forth in claim 31 wherein the first flexible transmitter also comprises a timing belt.*

*33. An internal combustion engine as set forth in claim 24 further including means for tensioning at least one of the flexible transmitters.*

*34. An internal combustion engine as set forth in claim 24 further including tensioning means for tensioning each of the pair of second flexible transmitters.*

*35. An internal combustion engine as set forth in claim 34 further including tensioning means for tensioning the first flexible transmitter.*

*36. An internal combustion engine as set forth in claim 24 wherein each of the second flexible transmitters is disposed at a point spaced from the one end of the engine and separated from the first flexible transmitter by at least one cylinder of each bank of cylinders.*

*37. An internal combustion engine as set forth in claim 36 wherein the first flexible transmitter comprises a timing belt.*

*38. An internal combustion engine as set forth in claim 36 wherein the pair of second flexible transmitters comprises a pair of timing belts.*

*39. An internal combustion engine as set forth in claim 38 wherein the first flexible transmitter also comprises a timing belt.*

*40. An internal combustion engine as set forth in claim 36 wherein each cylinder bank has a plurality of cylinders formed therein.*

*41. An internal combustion engine as set forth in claim 40 wherein the second flexible transmitters are disposed at the other end of the engine.*

*42. An internal combustion engine as set forth in claim 41 wherein the first flexible transmitter comprises a timing belt.*

*43. An internal combustion engine as set forth in claim 41 wherein the pair of second flexible transmitters comprises a pair of timing belts.*

*44. An internal combustion engine as set forth in claim 43 wherein the first flexible transmitter also comprises a timing belt.*

*45. An internal combustion engine as set forth in claim 36 further including means for tensioning at least one of the flexible transmitters.*

*46. An internal combustion engine as set forth in claim 36 further including tensioning means for tensioning each of the pair of second flexible transmitters.*

*47. An internal combustion engine as set forth in claim 36 further including tensioning means for tensioning the first flexible transmitter.*

* * * * *